(12) United States Patent
Urban et al.

(10) Patent No.: US 9,266,448 B2
(45) Date of Patent: Feb. 23, 2016

(54) ADJUSTMENT MECHANISM FOR THE LONGITUDINAL ADJUSTMENT OF A SEAT IN A MOTOR VEHICLE

(71) Applicants: Daniel Urban, Duesseldorf (DE); Robert Landskron, Monheim (DE); Arif Karadag, Leichlingen (DE); Wolfram Hofschulte, Bonndorf (DE); Fred Krimmel, Alstadt (DE)

(72) Inventors: Daniel Urban, Duesseldorf (DE); Robert Landskron, Monheim (DE); Arif Karadag, Leichlingen (DE); Wolfram Hofschulte, Bonndorf (DE); Fred Krimmel, Alstadt (DE)

(73) Assignee: IMS GEAR GMBH, Donaueschingen (DE)

( * ) Notice: Subject to any disclaimer, the term of this patent is extended or adjusted under 35 U.S.C. 154(b) by 129 days.

(21) Appl. No.: 13/822,989

(22) PCT Filed: Oct. 30, 2012

(86) PCT No.: PCT/DE2012/100333
§ 371 (c)(1),
(2) Date: Aug. 28, 2013

(87) PCT Pub. No.: WO2013/068000
PCT Pub. Date: May 16, 2013

(65) Prior Publication Data
US 2013/0328363 A1 Dec. 12, 2013

(30) Foreign Application Priority Data

Nov. 7, 2011 (DE) .......................... 10 2011 085 873

(51) Int. Cl.
*B60N 2/42* (2006.01)
*B60N 2/06* (2006.01)

(52) U.S. Cl.
CPC . *B60N 2/42* (2013.01); *B60N 2/067* (2013.01)

(58) Field of Classification Search
USPC ....................................... 297/344.1; 74/606 R
See application file for complete search history.

(56) References Cited

U.S. PATENT DOCUMENTS

| 6,322,146 | B1 * | 11/2001 | Fisher, Jr. | ................ 297/362.14 |
| 6,547,332 | B2 * | 4/2003 | Pejathaya | ................ 297/362.14 |

(Continued)

FOREIGN PATENT DOCUMENTS

| DE | 36 40 197 A1 | 11/1986 |
| DE | 101 39 051 A1 | 8/2001 |

(Continued)

OTHER PUBLICATIONS

Machine Generated Translation (DE 102008046274) Jul. 16, 2009.*

(Continued)

*Primary Examiner* — Sarah McPartlin
(74) *Attorney, Agent, or Firm* — Juneau & Mitchell

(57) ABSTRACT

An adjustment mechanism, particularly for the longitudinal adjustment of a seat of a motor vehicle, with a transmission housing (30) fastened at a first part (10), which is displaceable in reference to a second part (12), with a transmission being arranged inside the transmission housing (30). A spindle (40) projects from the transmission housing (30). The spindle (40) is coupled via a nut element (50) to a second part (12). The transmission housing (30) is made from plastic, with at least one repeatedly angled metal insert (60, 70) being embedded in the plastic. At least one wall (60*b*) of the metal insert (60, 70) is aligned orthogonal in reference to the axis (A) of the spindle and at least partially encompasses the spindle (40) on the side of the transmission housing (60) allocated to the nut element (30).

15 Claims, 4 Drawing Sheets

(56) References Cited

U.S. PATENT DOCUMENTS

| | | | |
|---|---|---|---|
| 7,340,974 B2* | 3/2008 | Landskron et al. | 74/425 |
| 7,802,487 B2* | 9/2010 | Knopfle et al. | 74/89.14 |
| 8,770,063 B2* | 7/2014 | Bhatti | 74/606 R |
| 2005/0126333 A1* | 6/2005 | Dohles et al. | 74/606 R |
| 2008/0264201 A1 | 10/2008 | Bhatti | |

FOREIGN PATENT DOCUMENTS

| | | |
|---|---|---|
| DE | 102 20 994 C1 | 5/2002 |
| DE | 102 50 994 A1 | 10/2002 |
| DE | 10 2006 006 925 A1 | 2/2006 |
| DE | 10 2008 046 274 A1 | 9/2008 |
| DE | 10 2009 028 536 A1 | 8/2009 |
| FR | 2 749 053 A1 | 5/1996 |
| WO | WO 02/070299 A1 | 9/2002 |

OTHER PUBLICATIONS

International Search Report of PCT/DE2012/100333 issued by WIPO, Mar. 15, 2013.

Office Action of Russian Patent Office issued for parallel application 2014123003, Aug. 21, 2015.

* cited by examiner

ADJUSTMENT MECHANISM FOR THE LONGITUDINAL ADJUSTMENT OF A SEAT IN A MOTOR VEHICLE

CROSS REFERENCE TO RELATED APPLICATIONS

This patent application claims priority to International Patent Application PCT/DE2012/100333, filed on Oct. 30, 2012, and thereby to German Patent Application 10 2011 085 873.3, filed on Nov. 7, 2011.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to an adjustment mechanism, particularly for a longitudinal adjustment of a seat in a motor vehicle.

Such an adjustment mechanism is known for example from DE 36 40 197 A1. Here, a motor is provided for applying a force upon a seat of a motor vehicle, which is fastened at a lower fastening part of the vehicle body. The motor drives a drive mechanism for the adjustable seat. This drive mechanism comprises a transmission housing, which is fastened fixed at the lower fastening part, as well as a spindle connected to said drive mechanism. The spindle is coupled via a nut element to an upper fastening part so that the upper fastening part can be displaced in the longitudinal direction in reference to the lower fastening part. Any rotation of the spindle causes a displacement of the nut element along the spindle, whereby the upper fastening part and the seat connected thereto can be moved back and forth in reference to the lower fastening part. Here, the transmission housing is made entirely from metal and accepts one end of the spindle, on which the spindle nut rests. This spindle nut is connected to a worm drive, which is driven by the motor via a suitable motor shaft.

FR 2749053 shows a similar adjustment mechanism. Here, again a spindle is disclosed projecting from the transmission housing. The spindle projects from the transmission housing, which is fixed at an upper bar of a seat adjustment mechanism of a motor vehicle.

The spindle penetrates a nut element fastened fixed at the bottom of the body of the motor vehicle. When the spindle rotates the upper bar moves in reference to the lower bar fastened at the base plate of the body of the motor vehicle, depending on the direct of rotation of the spindle towards the front or the back.

In case of a crash of the motor vehicle, strong forces develop which can bring the seat of the motor vehicle out of its rail guide, which of course represents a high safety risk. This safety risk must be minimized. Therefore FR 2749053 provides a particular crash protection. The crash protection essentially comprises a support disk made from metal, which is arranged between the transmission housing and the nut element. The support disk is fastened near the transmission housing on the spindle, and projects here with its external dimensions into an opening of the upper support bar. The opening of the upper support bar is here sized such that during normal operation the support disk can freely spin in this opening. For this purpose, the opening provided in the upper bar for the spindle axle is selected slightly larger than the width of the support disk. In case of a crash, i.e. when axial forces act upon the seat, this support disk can impact the upper bar, which provides an effective crash protection.

The relatively complex design of this adjustment mechanism is problematic, though. The upper bar must be provided with a separate opening, which the support disk can engage as a separate component, which must be welded onto the spindle. It is also problematic that the rail guide is designed unsymmetrical.

BACKGROUND OF THE INVENTION

The current state of knowledge is as follows.

The present invention is based on the objective to provide an adjustment mechanism, particularly for the longitudinal adjustment of a seat of a motor vehicle, which allows an effective crash support and requires no separate support disk.

The invention provides a simple design compared to seat adjusters currently on the market, allowing for efficiencies in manufacturing and lower cost.

BRIEF SUMMARY OF THE INVENTION

In a preferred embodiment, an adjustment mechanism for the longitudinal adjustment of a seat in a motor vehicle, comprising a transmission housing, which is fastened at a first part, which is displaceable in reference to a second part, wherein a transmission is arranged inside the transmission housing and a spindle projects from the transmission housing, which spindle is coupled via a nut element to a second part, wherein the transmission housing is made from plastic and at least one repeatedly angled metal insert is embedded in the plastic, further comprising at least one wall of the metal insert aligned orthogonal in reference to the axis of the spindle and which at least partially encompasses the spindle.

The adjustment mechanism as disclosed, wherein the wall of the metal insert part, aligned orthogonal in reference to the axis of the spindle and at least partially encompassing the spindle, is arranged on the side of the transmission housing allocated to the nut element.

The adjustment mechanism as disclosed, further comprising wherein two walls are aligned directly behind each other orthogonal in reference to the axis of the spindle.

The adjustment mechanism as disclosed, wherein the two walls are each angled from a one-piece metal insert.

The adjustment mechanism as disclosed, wherein the two walls are components of two different metal inserts engaging each other.

The adjustment mechanism as disclosed, further comprising wherein at least one metal insert is embedded in the transmission housing made from plastic such that all bearing points of the transmission housing are entirely made from plastic or are encapsulated by plastic.

The adjustment mechanism as disclosed, further comprising wherein at least one additional wall is provided at the metal insert, aligned orthogonal in reference to the axis of the spindle and arranged on the side of the transmission housing facing away from the nut element.

The adjustment mechanism as disclosed, further comprising wherein at least at one metal insert a wall is formed in one piece at the first part as a fastening flap for the transmission housing.

The adjustment mechanism as disclosed, further comprising wherein at least one metal insert is embodied as a punched and bent part.

The adjustment mechanism as disclosed, further comprising wherein a tubular flange is formed at the transmission housing, made from plastic, for the insertion of a drive shaft.

The adjustment mechanism as disclosed, further comprising wherein, when several angular metal insert parts are used, they are fastened to each other, particularly by way of welding.

The adjustment mechanism as disclosed, wherein the transmission located in the transmission housing can set in motion the spindle.

The adjustment mechanism as disclosed, wherein the plastic of the transmission housing is adjusted with regards to color to the first part or the second part or a device connected to one of these two parts.

The adjustment mechanism as disclosed, wherein the spindle nut is injection molded onto the spindle as a plastic part.

The adjustment mechanism as disclosed, wherein the spindle comprises a section with an enlarged diameter in the area of the spindle nut.

The adjustment mechanism as disclosed, wherein the spindle is coupled at one end to an end plate, which is inserted in a pocket of the transmission housing.

DETAILED DESCRIPTION OF THE INVENTION

Figure 1:
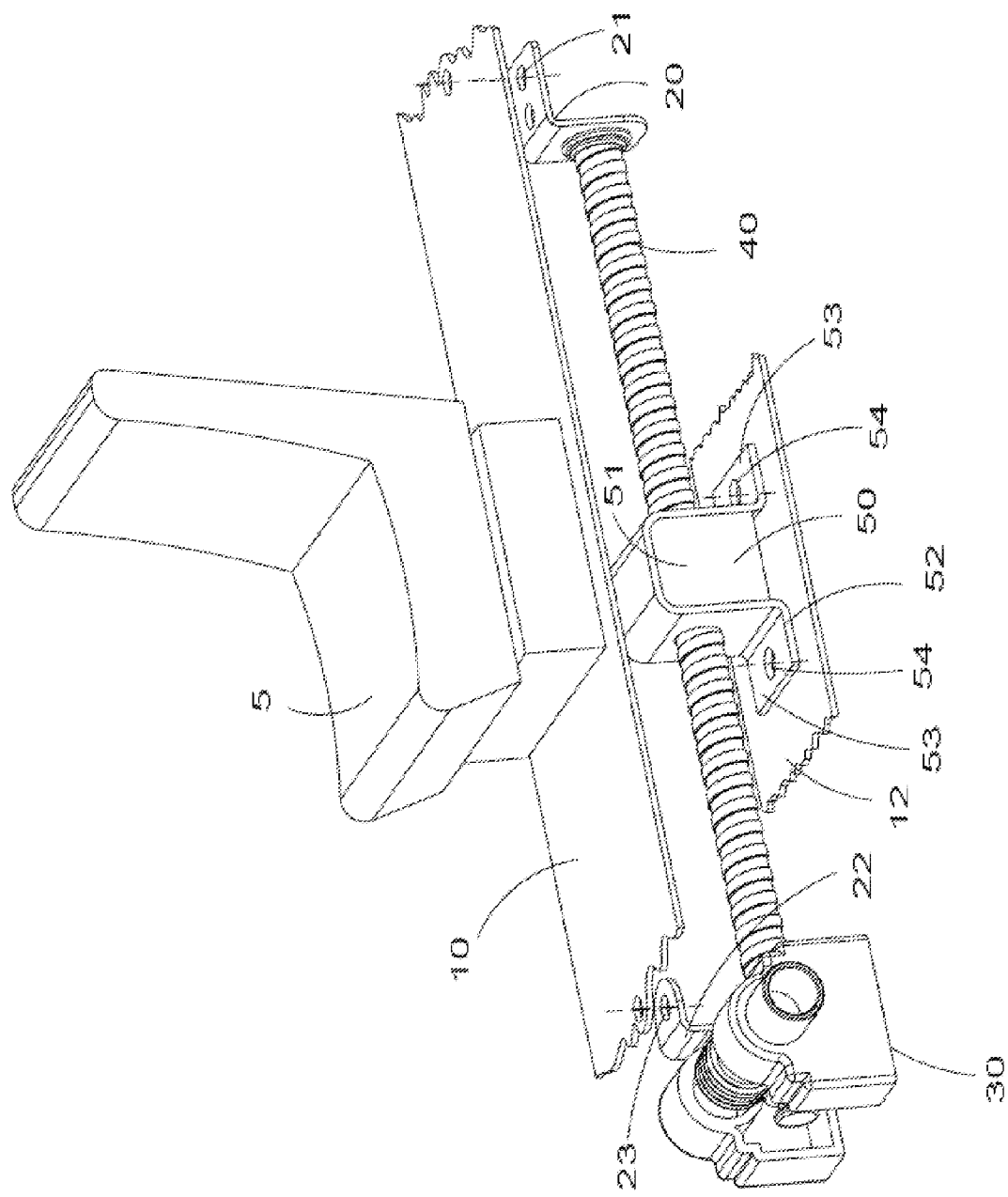
FIG. 1 is a line drawing evidencing an adjustment mechanism for the longitudinal adjustment of a seat of a motor vehicle comprising a transmission housing, a spindle, a nut element, as well as upper and lower bars indicated.

The invention is essentially based on the required crash support occurring by a particularly designed transmission housing. The transmission housing is made from plastic, with at least one metallic insert being integrated therein, which transmits the forces of the transmission spindle occurring by a frontal or rear collision upon the upper bar of the seat and thus allows sufficient force-fitting connection between the upper bar and the lower bar of the seat.

For this purpose, the adjustment mechanism comprises a transmission housing, which is fastened at a first part, e.g., the upper bar of a longitudinal adjustment mechanism for a seat. This first part is displaceable in reference to a second part, e.g. the bottom bar of a longitudinal adjustment mechanism of the seat of a motor vehicle. A transmission is arranged inside the transmission housing, with a spindle projecting from the transmission housing and with the spindle being coupled via a nut element to the second part. According to the invention the transmission housing is made from plastic. However, in reference to conventional plastic housings at least one metallic insert, angled in multiple places, i.e. a metal cage, is embedded in the plastic. At least one wall of the metallic insert is here aligned orthogonal in reference to the axis of the spindle, with this wall at least partially encompassing the spindle on the side of the transmission housing allocated to the nut element, preferably in a U-shaped fashion.

In order to increase the crash resistance, in a further development of the invention two or more walls of the metallic insert or several inserts can be aligned immediately behind each other orthogonal in reference to the axis of the spindle and at least partially encompass said spindle on the side of the transmission housing allocated to the nut element. This way, a metallic plate package quasi encompasses the spindle and compensates axial forces in case of a crash.

In a further development the two or several walls located side-by-side may be produced by bending a one-piece metallic housing shell or formed by two separate metallic inserts engaging each other.

Preferably the transmission housing is embodied such that all bearing points of the transmission housing are made entirely from plastic and/or are encased in plastic. Thus, according to the invention no separate bearing sockets must be provided as additional components. This improves the tolerance chain.

Furthermore, it is possible that walls of the metallic inserts are provided even at the side of the transmission housing facing away from the nut element, which are also orthogonal in reference to the axis of the spindle.

Furthermore, the scope of the invention includes that at least one wall is formed in one piece at the metallic insert as a fastening flap of the transmission housing. Using this fastening flap, e.g., the transmission housing can be connected to the upper bar of the seat adjustment mechanism, for example via screws.

It has proven beneficial and easy to produce when at least one metal insert is embodied as a punched and bent part or as a deep-drawn part.

In another further development of the adjustment mechanism it is provided that a tubular flange is formed at the transmission housing made from plastic, for inserting a drive shaft.

Furthermore, in order to increase the stability of the metal cage embedded in the plastic housing or injection-molded therein, when several angular metal inserts are used to form this metal cage, they can be welded to each other.

Although in principle the adjustment mechanism may be embodied with a stationary or rotating spindle, the concept of an adjustment mechanism with a rotating spindle is preferred, here. Furthermore, it is also possible in principle that a pinion is used instead of a spindle, which engages transmission parts located in the transmission housing.

According to the invention the plastic of the transmission housing is adjusted with regards to its color to the first part, thus the upper bar or the second part, thus the lower bar, or a device connected to one of these two parts, e.g., a seat cushion located on the seat frame or a blind of the seat frame or vehicle carpeting. Compared to commonly used metal housings (made from zinc, aluminum, or steel) which require enameling for an adjustment with regards to color, by an individual coloration of the plastic an optimal visual adjustment of the transmission housing to the environment can occur.

DETAILED DESCRIPTION OF THE FIGURES

FIG. 1 shows schematically a longitudinal adjustment mechanism for a seat for a motor vehicle as an example. The seat 5 is assembled on a seat frame, which is connected fixed with a first part 10, in this case an upper bar. This first part 10 is displaceable in reference to the second part 12, here a lower bar.

The second part 12 is connected, e.g., with the bottom of the body of a motor vehicle by this second part being screwed to the bottom of the body of the motor vehicle.

The relative longitudinal movement of the first part 10 in reference to the second part 12 is caused by an adjustment mechanism. For this purpose, the adjustment mechanism comprises a transmission housing 30 in which a transmission is located. This transmission includes, e.g., a worm drive coupled to a motor, not shown, which combs via a spindle nut. The spindle nut is placed here in a torque-proof fashion on a spindle 40, which preferably projects at one side out of the transmission housing 30. Here, the transmission housing 30 is connected fixed via a fastening bracket 22 and the other end of the spindle 40 via another fastening flap 20 to the first part 10, e.g. screwed thereto via fastening openings 21, 23. The other end of the spindle 40 is rotationally supported at the fastening flap 20.

A nut element 50 rests on the spindle 40, with said nut in turn connected fixed to the second part 12, thus the lower bar. This nut element 50 essentially shows a nut block 51, which comprises an internal thread, in which a spindle 40 can rotate. This nut block 51 is held by a U-shaped bracket 52, with the spindle 40 projecting through its two U-legs. This U-shaped bracket 52 is screw-connected via fastening flaps 53 with bore holes 54 at the second part 12, thus the lower bar.

When the worm drive of the transmission is made to rotate by a motor, not shown, the spindle 40 also spins. Any rotation of the spindle 40 ensures that, depending on the direction of rotation of the spindle 40, the upper part 10 and thus the upper bar including the seat 5 located thereon is moved toward the right in the illustration of FIG. 1 and thus the seat 5 is moved backwards or the upper part 10 inwardly and thus the seat 5 towards the front.

Figure 2:
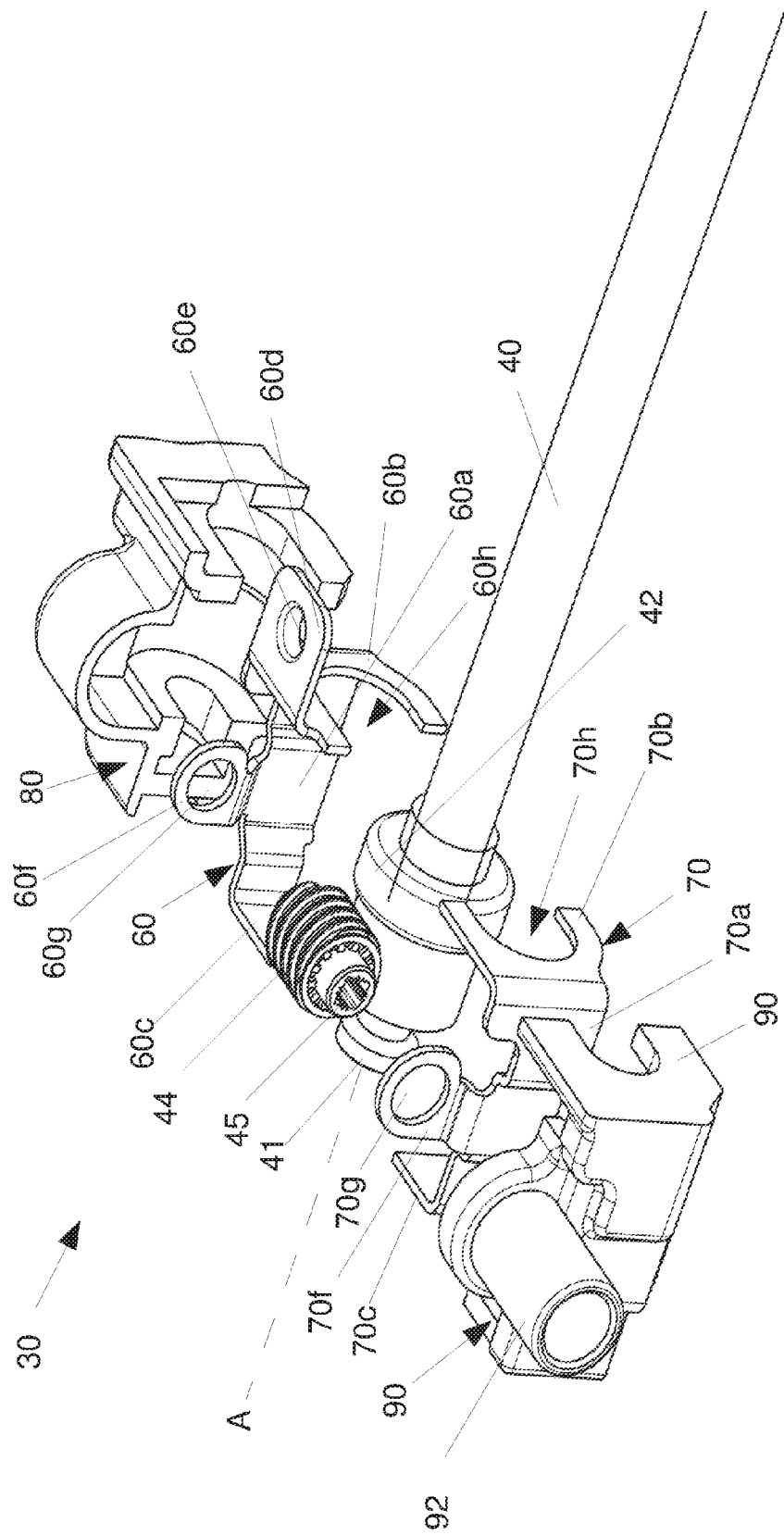
FIG. 2 is a line drawing evidencing a detail of the adjustment mechanism of FIG. 1 in the area of the transmission housing with two housing parts and two metallic inserts in a perspective illustration diagonally from the front.
Figure 3:
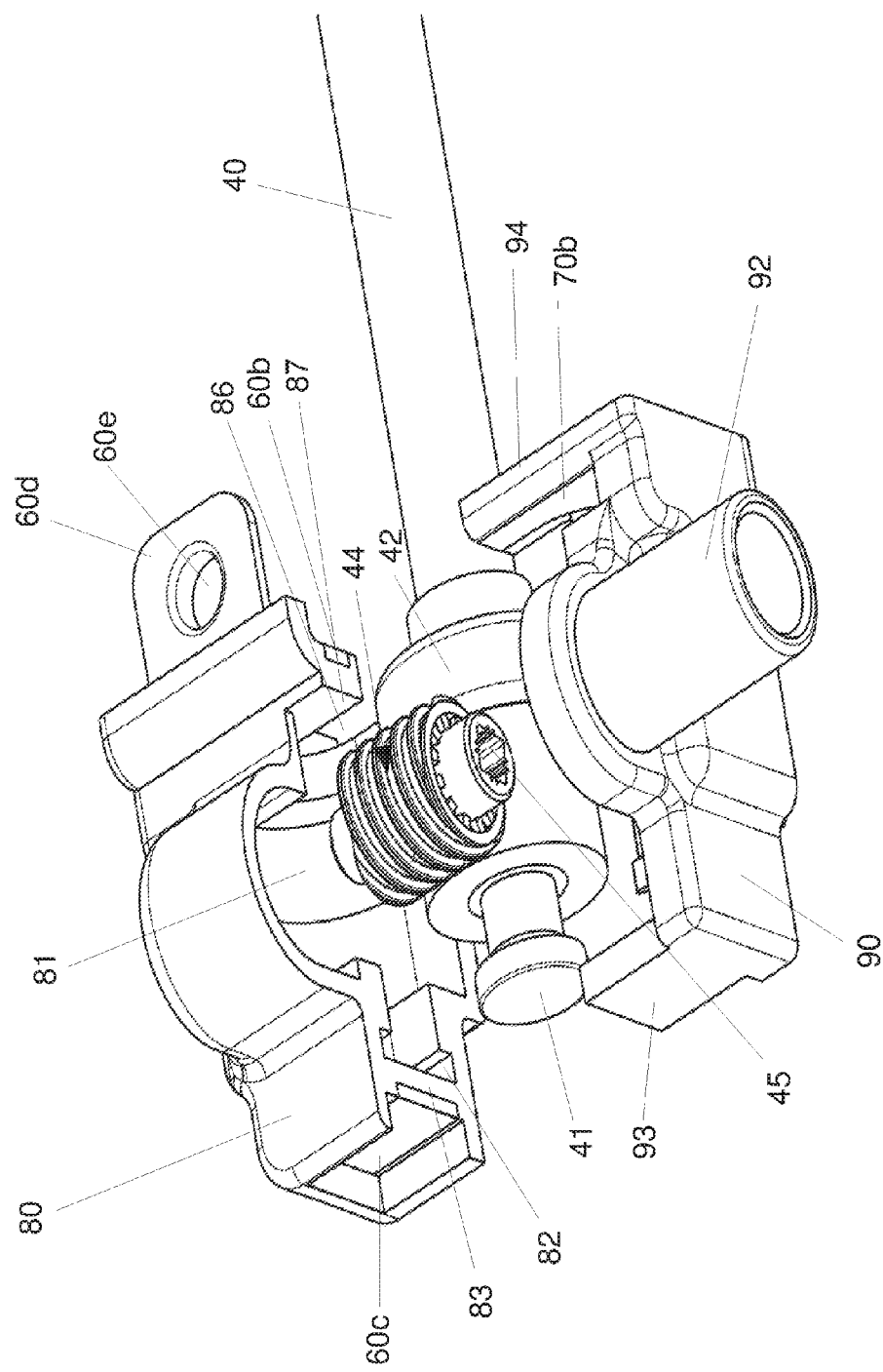
FIG. 3 is a line drawing evidencing the adjustment mechanism of FIG. 2 in a perspective view, diagonally from the back, with metal inserts already inserted into the two housing parts.
Figure 4:
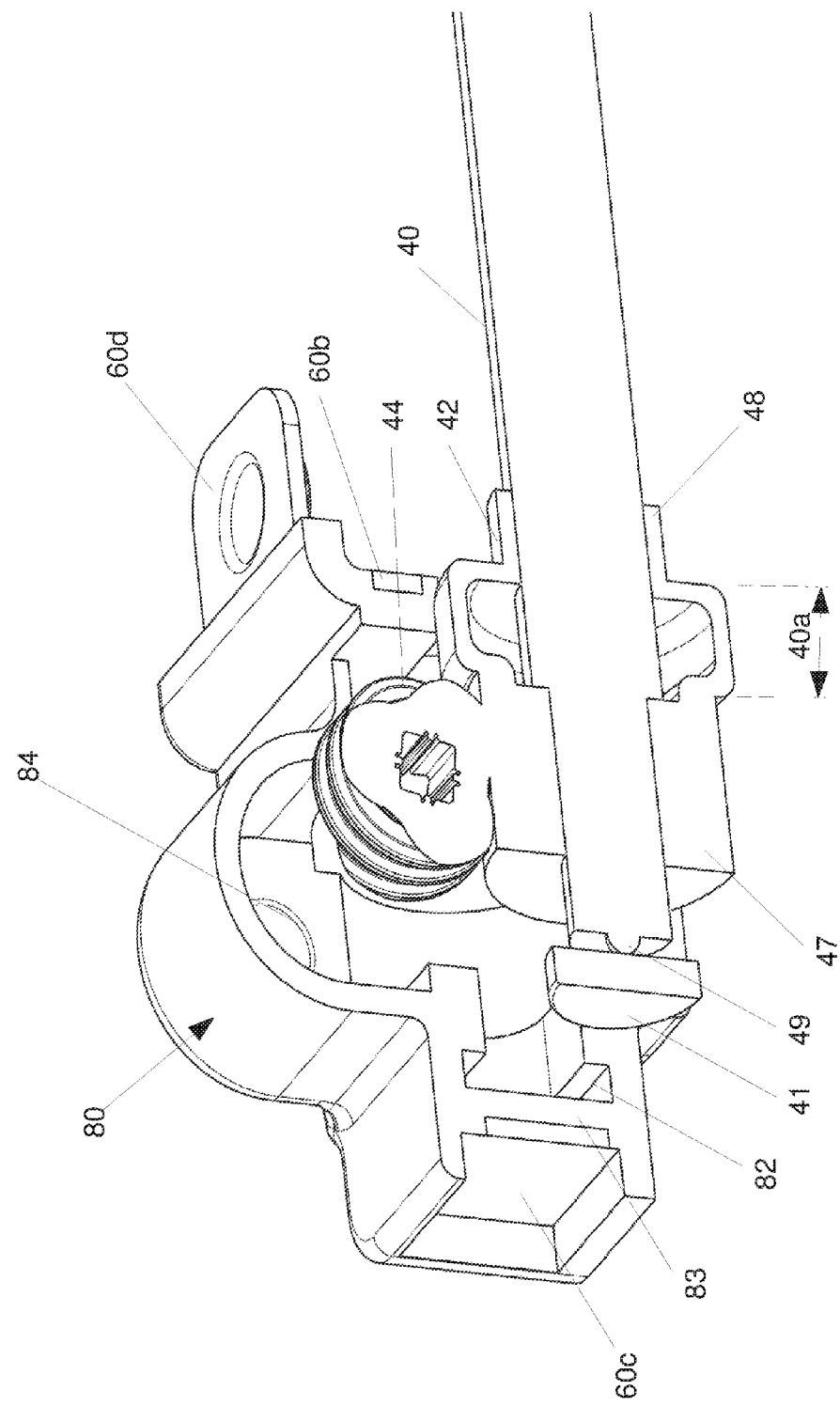
FIG. 4 is a line drawing evidencing a cross-section of the adjustment mechanism of FIG. 3 along a vertical level, extending through the transmission housing and sectioning the axis of the spindle.

The particularly crash-safe embodiment of the transmission housing 30 is discernible from the following FIGS. 2 through 4.

FIG. 2 shows a detail of the adjustment mechanism of FIG. 1 in the area of the transmission housing 30, diagonally from the front and the top in a perspective view. The transmission housing 30 comprises two housing parts 80, 90. One metallic insert 60, 70 is placed in each of these housing parts 80, 90. The metallic inserts 60, 70 are preferably embodied from punched and bent parts or monocast parts and the housing parts 80, 90 either inserted or coated by way of injection molding in a suitable fashion. The two housing parts 80, 90 with the metallic inserts 60, 70 located therein encompass one end of the spindle 40, at which a spindle nut 42 and preferably also a connection plate 41, e.g., disk-shaped, is arranged. The spindle nut 42 combs with a worm drive 44, which at one side or preferably at both sides is provided with an opening 45 to insert a drive shaft. The two housing parts 80, 90 with the metallic inserts 60, 70 also encompass the worm drive 44. Preferably, after the assembly the two housing parts 80, 90 are fastened to each other in a suitable fashion, for example welded together via ultrasound, adhered, hot-caulked, laser welded, riveted, or connected via screws. The housing part 90 shown at the bottom left in FIG. 2 additionally shows a tubular flange 92, by which the drive shaft, not shown, can be coupled to the opening 45 of the worm drive 44.

The two metallic inserts 60, 70 are embodied in a particular fashion to increase the crash resistance of the transmission housing 30. They at least partially encompass the spindle 40 with one of their walls on their side allocated to the nut element 50, shown in FIG. 1, in the present exemplary embodiment of FIG. 2 in a U-shaped fashion. Although it would already be sufficient for increasing the crash-resistance to provide only one of the metal inserts 60, 70, here preferably both metal inserts are placed in the manner shown in FIG. 2 in the housing parts 80, 90.

The metal insert 60 comprises a first wall 60a, which extends parallel in reference to the axis A of the spindle 40 and is embodied slightly longer than the spindle nut 42. Two walls 60b and 60c extend from this wall 60a of the metal insert 60 at a right angle towards the axis A of the spindle. The angular wall 60c is embodied massively, and provided to engage behind the end plate 41 at the end of the spindle 40. The front wall 60b, similar to the rear wall 60c, is aligned orthogonal in reference to the axis A of the spindle 40, and shows a U-shaped opening 60h, through which the spindle 40 can penetrate it. At the upper side of this U-shaped wall 60b, at a right angle, another wall 60d is provided at an angle in the direction of the nut element 50 and shows a circular opening 60e. This wall 60d with the corresponding opening 60e serves as the fastening flap, in order to fasten the transmission housing 30 in the manner shown in FIG. 1 at the upper part 10 and thus the upper bar via a suitable screwed connection.

As discernible from FIG. 2, from the wall 60a upwards, approximately parallel, another circular wall part 60f extends, which shows a circular opening 60d. This wall part 60f encompasses the rear flange of the worm drive 44, shown in FIG. 2, and serves on the one hand for further increasing the stability of the overall transmission housing 30 and on the other hand this wall part 60f ensures that the friction heat developing during the rotation of the worm drive 44 can be dissipated very well.

It shall be mentioned that the wall part 60f and also the wall 60b with its U-shaped opening 60h are not in direct contact with the worm drive 44 and/or the spindle 40. Rather, exclusively wall parts of the housing part 80 serve as bearing points for the worm drive 44 and the spindle 40, which are made from plastic as mentioned above. Beneficially here the wall 60f with the opening 60g and the wall 60b with the U-shaped opening 60h are covered by plastic of the housing part 80 at all sides via injection molding so that the support points for the worm drive 44 and the spindle 40 exclusively represent plastic bearing points, which are integrated in the housing part 80 and/or 90.

Although as already mentioned the second metal insert 70 is not mandatory, it has proven beneficial to use it for an additional increase of the crash stability of the transmission housing 30. This second metal insert 70 is embodied similar to the first metal insert 60, however, the above-mentioned fastening flap is omitted, although such a fastening flap could be provided here, too, if additional stability during assembly of the transmission housing 30 at the upper bar 10 was desired.

In detail, the second metal insert 70 also extends over a longitudinal wall 70a, parallel in reference to the axis A of the spindle 40, with a rear wall 70c extending therefrom to the axis A of the spindle 40, which is embodied massively and comprises a frontal wall 70b, extending parallel in reference thereto, which also shows a U-shaped opening 70h at least partially encompassing the spindle 40. Additionally, at the top of the longitudinal wall 70a, similar to the insert part 60, an annular wall 70f is provided with an opening 70e in order to encompass the flange of the worm drive 60 facing the viewer in FIG. 2. This wall 70f also serves primarily to dissipate heat, but also to increase the stability of the overall transmission housing 30.

As already mentioned in the context with the first metallic insert 60 and the housing part 80, the second metallic insert 70 is also covered by the housing 90 made from plastic, so that all bearing points, thus the bearing point for the flange of the worm drive 44 and the bearing point for the spindle 40, are not in contact with the metal insert 70, but rather with the plastic of the housing part 90.

FIG. 3 further shows the adjustment mechanism of FIG. 1 and FIG. 2 in a perspective view, however, now diagonally from the rear, with the metallic inserts 60, 70 already being inserted in the housing parts 80, 90 and/or injection molded therein.

It is clearly discernible that the wall 60d with its opening 60e projects towards the front from the first metal insert 60 out of the housing part 80. The housing part 80 shows an opening 81 into which the spindle nut 42 and the worm drive 44 can be inserted. This opening 81 is limited at its end, shown in FIG. 3 at the left, by a slot-shaped pocket 82 into which the end plate 41 of the spindle 40 can be inserted. This pocket 82 is limited towards the rear by a wall section 83 of the housing part 80. This wall section 83 is engaged by the wall 60c of the metal insert 60. On the side of the opening 81 of the housing part 80 opposite the pocket 82 a U-shaped opening 86 is located, which serves as the bearing point for the spindle 40 and is limited over its entire surface by the plastic of the housing part 80. This section of the bearing point is provided with the reference character 87. The wall section 60b of the metal insert 60 therefore cannot come into contact with the spindle 40.

The second metal insert 70 is embedded in the second housing part 90. In FIG. 3 only the wall 70b of the metal insert 70 is discernible. Here, too, it is clearly visible that the wall 70b towards the spindle 40 is covered by the plastic of the second housing part 90 such that the metal insert 70 cannot come into contact with the spindle 40, either. The housing part 90 shows two wall sections 93, 94 projecting towards the housing part 80, by which the housing 90 can be inserted into respective recesses of the housing part 80. This way, the wall part 93 of the housing part 90 engages behind the wall 60c of the first metal insert 60 during the assembly of the housing parts 80 and 90, while the wall part 94 of the housing 90 is located with the wall 70b of the second metal insert 70 in front of the wall 60b of the first metal insert 60.

In the assembled state of the housing parts 80, 90 with the metal inserts 60, 70 located therein this way the spindle 40 is encompassed at its side facing the nut element 50 with two walls 60b, 70b, here metal inserts 60, 70 so that in the event of a crash the entire transmission housing 30 can very well compensate the crash forces. The crash resistance is further increased such that the end plate 41 can be supported additionally at two metal walls, placed directly behind each other, namely the walls 60c and 70c of the metal inserts 60 and 70.

FIG. 4 shows a similar view of the transmission as in FIG. 3, however, now without the second housing part 90, with the spindle 40 being located along a level sectioning in which the axis A of the spindle is located. In addition to the cross-section of the spindle 40, the spindle nut 42, the worm drive 44, and the cover plate 41, are also shown in a cross-section. The cover plate 41 is not connected fixed to the end of the spindle 40. Rather, a spherical element 49, preferably a steel ball, is inserted into the facial end of the spindle 40, which slightly projects from the face of the spindle 40. This spherical element 49 serves as an axial bearing element. The cover plate 41 may show an indentation in the center, in which the spherical element 49 can contact. The already known reference characters represent the parts discussed, whereupon in FIG. 4 additionally the bearing point 84 is clearly discernible for the flange of the worm drive 44, facing away from the viewer. This bearing point 84 is limited over its entire circumference by plastic. In the context with the wall 60g explained in FIG. 2 the metal insert 60 is here covered by the plastic of the housing part 80 in an injection molded fashion.

In order to further increase the crash resistance of the transmission the spindle 40 is embodied thicker at the section marked with the reference character 40a in FIG. 4, thus in this area 40a it shows a greater diameter than in the remaining part of the spindle 40. This thickening serves for the radial and axial form-fitting. In reference to the axis A of the spindle 40 a socket 47, 48 is provided upstream and downstream in reference to this thickened section and placed upon the spindle 40. These sockets 47, 48 preferably are made from metal. In case of a crash this thickened section 40a of the spindle 40 is supported via the sockets 47 and/or 48 at the metallic walls 60c and/or 70c and 60b and/or 70b of the metal inserts 60 and 70.

LIST OF REFERENCE NUMBERS 5 seat
10 first part, upper bar
12 second part, lower bar
20 fastening bracket
21 bore hole
22 fastening bracket
23 bore hole
30 transmission housing
32 plastic wall
40 spindle
40a detail of the spindle 40 with an enlarged diameter
41 cover plate
42 spindle nut
44 worm drive
45 opening
47 socket
48 socket
49 spherical element
50 nut element
51 nut block
52 U-bracket
53 fastening flaps
54 bore holes
56 bore holes
60 first metal insert
60a wall
60b wall
60c wall
60d wall
60e opening
60f wall
60g opening
60h U-shaped opening
70 second housing shell
70a wall
70b wall
70c wall
70f wall
70g opening
70h U-shaped opening
80 first housing part
81 opening
82 pocket 83 wall section
84 bearing site
86 U-shaped opening
90 second housing part
92 flange
93 wall section
94 wall section
A axis of the spindle The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

We claim:

1. An adjustment mechanism for the longitudinal adjustment of a seat in a motor vehicle, comprising a transmission housing, which is fastened at a first part, which is displaceable in reference to a second part, wherein a transmission is arranged inside the transmission housing and a spindle projects from the transmission housing, which spindle is coupled via a nut element to a second part, wherein the transmission housing is made from plastic and at least one repeatedly angled metal insert is embedded in the plastic, further comprising wherein two walls of one or several metal inserts are aligned directly behind each other orthogonal in reference to the axis of the spindle and at least partially encompasses the spindle.

2. The adjustment mechanism of claim 1, wherein the wall of the metal insert part, aligned orthogonal in reference to the axis of the spindle and at least partially encompassing the spindle, is arranged on the side of the transmission housing allocated to the nut element.

3. The adjustment mechanism of claim 1, wherein the two walls are each angled from a one-piece metal insert.

4. The adjustment mechanism of claim 1, wherein the two walls are components of two different metal inserts engaging each other.

5. The adjustment mechanism of claim 1, further comprising wherein wherein at least one metal insert is embedded in the transmission housing made from plastic such that all bearing points of the transmission housing are entirely made from plastic or are encapsulated by plastic.

6. The adjustment mechanism of claim 1, further comprising wherein at least one additional wall is provided at the metal insert, aligned orthogonal in reference to the axis of the spindle and arranged on the side of the transmission housing facing away from the nut element.

7. The adjustment mechanism of claim 1, further comprising wherein at least at one metal insert a wall is formed in one piece at the first part as a fastening flap for the transmission housing.

8. The adjustment mechanism of claim 1, further comprising wherein at least one metal insert is embodied as a punched and bent part.

9. The adjustment mechanism of claim 1, further comprising wherein a tubular flange is formed at the transmission housing, made from plastic, for the insertion of a drive shaft.

10. The adjustment mechanism of claim 1, further comprising wherein, when several angular metal insert parts are used, they are fastened to each other, particularly by way of welding.

11. The adjustment mechanism of claim 1, wherein the transmission located in the transmission housing can set in motion the spindle.

12. The adjustment mechanism of claim 1, wherein the plastic of the transmission housing is adjusted with regards to color to the first part or the second part or a device connected to one of these two parts.

13. The adjustment mechanism of claim 1, wherein the spindle nut is injection molded onto the spindle as a plastic part.

14. The adjustment mechanism of claim 1, wherein the spindle comprises a section with an enlarged diameter in the area of the spindle nut.

15. The adjustment mechanism of claim 1, wherein the spindle is coupled at one end to an end plate, which is inserted in a pocket of the transmission housing.

* * * * *